May 2, 1939. D. M. DUNWOODIE, SR 2,156,683
FASTENING DEVICE
Filed March 31, 1938    2 Sheets-Sheet 1
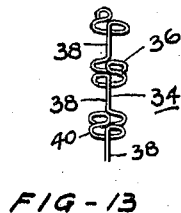
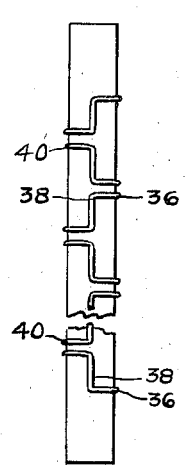
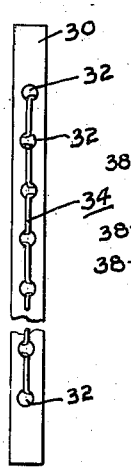
FIG-13  FIG-14  FIG-4  FIG-3  FIG-2  FIG-1
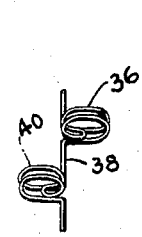
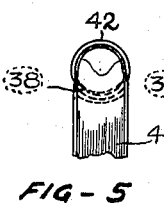
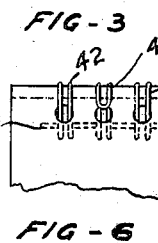
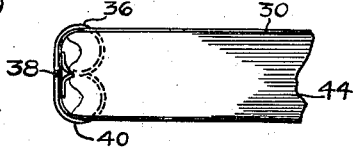
FIG-15  FIG-5  FIG-6  FIG-8
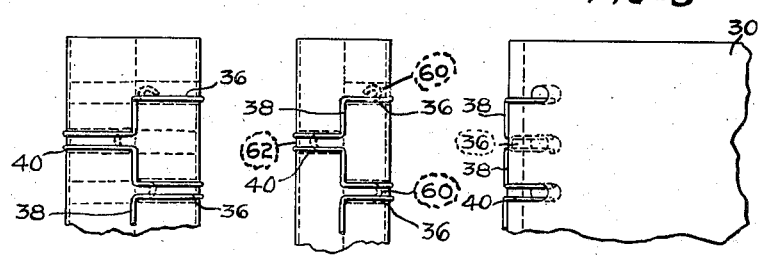
FIG-10  FIG-9  FIG-7
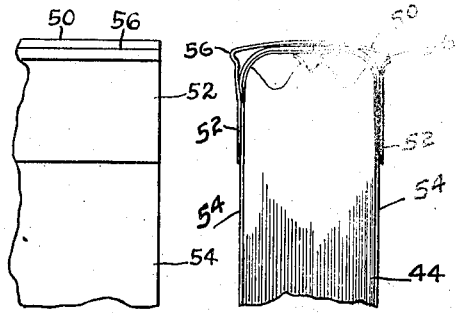
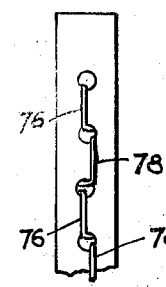
FIG-12  FIG-11  FIG-23
INVENTOR
David M Dunwoodie Sr.
BY Henry G. Dylwig
ATTORNEY May 2, 1939.　　D. M. DUNWOODIE, SR　　2,156,683
FASTENING DEVICE
Filed March 31, 1938　　2 Sheets-Sheet 2

INVENTOR
David M Dunwoodie Sr.
BY Henry G. Dybvig
ATTORNEY

Patented May 2, 1939

2,156,683

UNITED STATES PATENT OFFICE 2,156,683

FASTENING DEVICE

David M. Dunwoodie, Sr., Dayton, Ohio

Application March 31, 1938, Serial No. 199,057

8 Claims. (Cl. 281—25)

This invention relates to bonding means for fastening a plurality of sheets together and more particularly to bonding means made from wire.

In the past, helical coils and certain modifications thereof have been used for binding sheets together; but these have required a rather long, tedious operation of screwing the coil through the marginal apertures. After they are screwed into position, the coils may be formed or bent into shape so as to lock the assembly in position.

An object of this invention is to provide a bonding device formed from a continuous length or several pieces of looped wire provided with sufficient flexibility to accommodate varying degrees of thicknesses of sheet material held together, as for example, magazines, pamphlets, books, tablets, pads and articles of similar character.

Another object of this invention is to provide a bonding device made from a continuous length of wire that can be utilized for securing together varying degrees of thicknesses of material which may result from a varying number of sheets or different types of sheets, without changing or adjusting the equipment used in producing the bonding device.

Another object of this invention is to produce a bonding device adaptable for use with round holes perforated or drilled near the margins of the sheets to be bound together.

Another object of this invention is to provide a bonding device made from a continuous length of wire formed into a plurality of loops held in spaced relation from each other by bonds, the loops being directed in opposite directions and staggered with respect to each other.

Another object of this invention is to provide a bonding device made from a continuous length of wire, which bonding device may be readily opened or disassembled so as to permit the insertion or removal of sheets of the sheet material fastened together.

Another object of this invention is to provide a loop assembly for holding sheets together adaptable for use with a cover having a V-shaped rib projecting inwardly from the back for engagement with the loop assembly.

Another object of this invention is to provide a bonding device that is easily produced, that is cheap, is easily assembled and at the same time strong, durable and dependable, an assembly that is well suited for mass production.

Other objects and advantages reside in the construction of parts, the combination thereof and the mode of operation, as will become more apparent from the following description.

In the drawings, Fig. 1 is a fragmentary side view of a book or magazine utilizing the bonding device.

Fig. 2 is an end view of the embodiment shown in Fig. 1.

Fig. 3 is a back view with the cover in position.

Fig. 4 is a back view showing the same size of bonding wire as disclosed in Fig. 3; but with loops widened out to accommodate more sheets and showing another adaptation where the loops are exposed on the outside of the cover.

Fig. 5 discloses another adaptation of the bonding embodiment where the wire separating the loops is inside the cover.

Fig. 6 is a side view of Fig. 5 showing how the widened out loops disclosed in Fig. 5 bind the sheets while these loops do not form a complete circle.

Fig. 7 discloses another adaptation where the wires coming from opposite sides bind only one-half of the book.

Fig. 8 is an end view of the embodiment shown in Fig. 7.

Fig. 9 is a back view of the book or the magazine of the embodiment shown in Figs. 7 and 8, to show how the holes in each half do not register with one another.

Fig. 10 is another back view of the same embodiment as shown in Fig. 7; but showing the holes registering in each half bound separately by wire loops entering from opposite directions.

Fig. 11 discloses a modification similar to that disclosed in Fig. 8, wherein the binding has been provided with a back.

Fig. 12 is a fragmentary side view of the modification disclosed in Fig. 11.

Fig. 13 discloses a fragmentary, perspective view of the bonding device shown in Figs. 1, 6 and 8 respectively.

Fig. 14 discloses a fragmentary, perspective view of the bonding device as disclosed in Figs. 4, 5 and 6.

Fig. 15 discloses the adaptation of the bonding device as shown in Figs. 7, 8, 9, 10 and 11.

Figure 16:
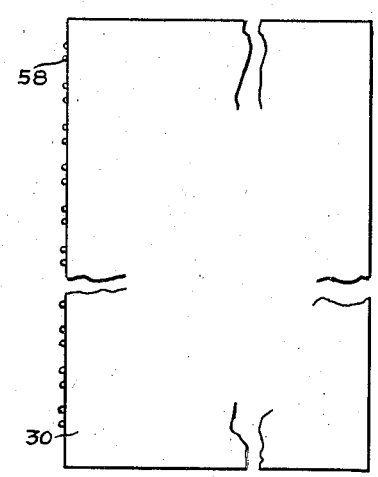

Fig. 16 discloses a side elevation of another adaptation of the preferred embodiment.

Figure 17:
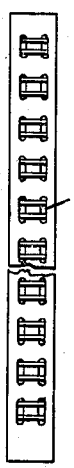

Fig. 17 discloses a back view of the adaptation disclosed in Fig. 16.

Figure 18:
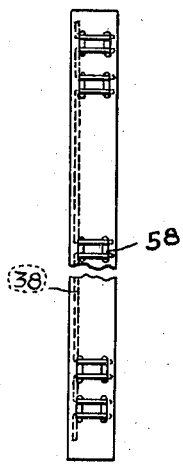

Fig. 18 discloses another modification.

Figure 19:
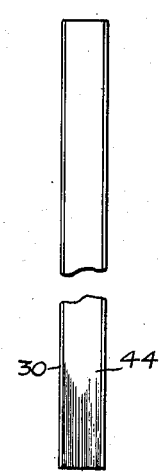

Fig. 19 discloses a front view of the modification disclosed in Fig. 16.

Figure 20:
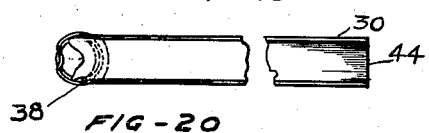

Fig. 20 discloses an end view of the modification disclosed in Fig. 16.

Figure 21:
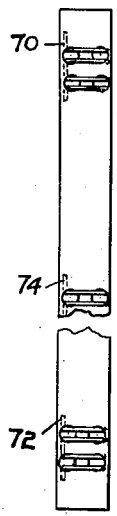

Fig. 21 is a back view of another modification.

Figure 22:
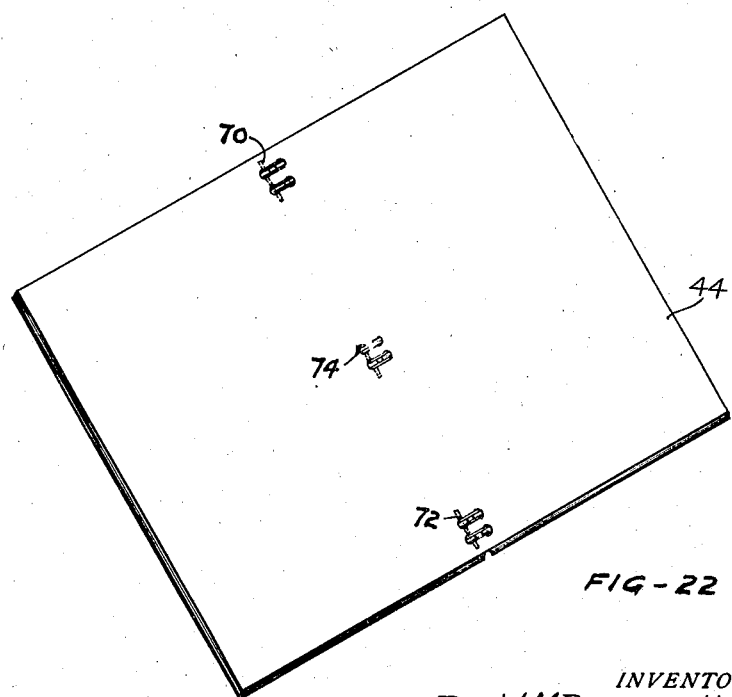

Fig. 22 is another view of the bound sheets in open position, to show the continuity of the two exposed pages.

Fig. 23 is a back view of another modification.

Various attempts have been made in the past to utilize a continuous length wire that is threaded or formed into a helical coil and screwed into position by being passed through a series of successive marginal apertures in the sheets of material to be bound. These sheets of material may be paper, leather, sheet metal, cardboard, cloth or any other suitable type of material that should be bound or secured together.

In the event an error is made in the assembly of the book when helical coils or modifications thereof are used, whether it be a note book, a magazine or some other permanently bound book, it would be necessary either to completely destroy the helical coil or unwind it in order to make any alterations or corrections in the assembly.

In the present embodiment a continuous length of wire has been formed into two or more series of loops interconnected by suitable bonding portions extending longitudinally along the back of the bound sheets of material. One series of loops extends in one direction from the bonding portions and is formed so as to project from one side of the sheets into marginal apertures therein. The other series of loops extends in the opposite direction from the bonding portions and is formed to project from the opposite side of the sheets into other apertures therein.

In the event a mistake has been made in the assembly of the sheets of material, it is merely necessary to retract the loops from the apertures to permit rearrangement, additions to or removal from the assembly of sheets. The loops may again be projected into their respective apertures. The reassembled magazines may be introduced into the proper place in the line of assembly to be rebound. It has been found that large bundles of magazines are returned to the publishers for the reason that one or more sheets have been omitted. When magazines are bound in the conventional way it is practically useless to try to repair or correct the errors; but instead, it has been found to be cheaper and quicker to run a reprint or supply perfect copies from stock on hand. By the use of the bonding device disclosed in the present application, it is not necessary to waste the magazines, as it is merely necessary to remove the bonding device, insert or rearrange the sheets and rebind the magazine without marring the pages whatsoever.

Referring to the drawings, the reference numeral 30 indicates a cover or the binding for magazines, books, notebooks, pamphlets, tablets, pads and articles of similar character. The back of the cover, as may best be seen by referring to Fig. 3, is provided with a plurality of aligned apertures 32, through which apertures extends a bonding device 34, formed from a continuous piece of wire, or several pieces of wire, as the case may be.

The apertures 32 need not necessarily be aligned. These could be staggered or offset, so as to accommodate the respective loops.

The bonding device per se has been shown in Figs. 13 and 14. In these figures it can be readily seen that the bonding device includes a reversely bifurcated projection formed into a curved loop, or prong-like extension 36, extending from the bonding or link portions 38 in a counterclockwise direction, as viewed in Fig. 13. The bonding portion includes a reversely bifurcated projection formed into a second loop, or prong-like extension 40, extending in an opposite direction from the bonding or link portion 38 in a clockwise direction. In the disclosure shown in Fig. 13 the free ends of the loops 36 and 40 contact the bonding portions 38, so as to form closed loops. When in use the loops 36 and 40 project into a row of holes 42 arranged in spaced relation from each other, but near the margins of the sheets of material 44. All the loops 36 project into the apertures from one side of the sheets of material and the loops 40, extending in the opposite direction from the bonding portions 38, project into apertures from the opposite side of the sheets of material. Whenever the quantity of paper, or other material to be bound, is sufficiently small, the loops 36 and 40 are closed.

One of the important and salient features of this invention is its flexibility in use. The same size of bonding wire may be used to accommodate more or less sheets, that is, if the number of sheets is increased, the loops may be widened out to accommodate the additional sheets. This has been done in Fig. 4, where the loops are exposed on the outside of the cover.

In the event the stack of sheet material is too thick for closing the loops completely, the loops may be left open in a manner similar to that shown in Fig. 14, which is a perspective view of the bonding device disclosed in Fig. 4. The loops in this showing terminate in spaced relation from the bonding portions, leaving a gap between the tip of the loop and its base. This has been further emphasized in Fig. 6, where the center loop terminates in spaced relation from the aperture. In both Figures 6 and 14 the loops extending from one side of the bonding portions overlap the loops extending from the opposite side, so as to prevent removal of the sheets of material without spreading the loops apart.

In Fig. 5 another adaptation of the bonding device has been shown. In this adaptation the bonding portions 38, extending between the loops or prong-like extensions, have been mounted inside the cover, so as to completely conceal the bonding portions 38 from the rear or back of the book, or the like. The widened out loops shown in Fig. 5 have been further shown in Fig. 6. These widened out loops bind the sheets while the loops do not form a complete circle, the ends of the loops or prong-like portions terminating in spaced relation from the bonding portions, as is clearly seen in Fig. 14.

In the modification disclosed in Figs. 1, 2 and 3, the bonding portions 38 extend along the center of the back of the bound volume. Instead of extending along the center, the bonding portions 38 may extend along one side of the sheets of material, as shown in Fig. 20, which will be more fully described later.

Another adaptation of the bonding device having the prong-like extensions or loops coming from opposite sides is to bind only one-half of the book by one series of loops, the holes in one-half being so disposed as to not register with the holes in the other half. The wire of this adaptation has been shown in perspective view in Fig. 15, where the bonding portions are mounted on the outside of the cover.

In the modification disclosed in Figs. 7 to 15 inclusive, the stack of material may be too thick to firmly hold the sheets in position by the use of open loops like those disclosed in Fig. 14. In this event, the loops 40, extending from one side of the bonding portions 38, as shown in Fig. 15, may be formed into closed loops on one side of the bonding portions and the loops 36 formed into closed loops on the other side of the bonding portions 38, the longitudinal axes extending through the loops or coils formed by the loops 36 and 40 being parallel to the bonding portions 38, but in spaced relation from each other. By this arrangement, the coils formed from the loops 36 may hold one stack of sheets of material and the coils formed from the loops 40 may hold another stack of sheets of material, the sheets when folded together extending in parallel relation, as may best be seen by referring to Figs. 8 and 11. In the modification disclosed in Figs. 11 and 12, the backing strip 50, having the sides 52 cemented or otherwise secured to the cover 54, provides a backing for the binding, so as to conceal the portions of the bonding device 38 projecting to the rear of the cover 54. The backing member 50 is preferably provided with folds 56, providing flexibility for opening and closing the volume.

In Fig. 9 it can be readily seen that the holes 60 in the half of the sheets shown to the right of this figure, do not register with the holes 62, only one of which has been shown, in the half of the sheets to the left of Fig. 9, that is, the holes 60 are staggered with respect to the holes 62. In the modification disclosed in Fig. 10 the holes in both halves register; but only half of the holes in each half have been utilized.

Another stack of sheets having a thickness about the same as half of the sheets shown in Fig. 8 could be bound with the sheets shown in Fig. 8, by using another bonding assembly like that shown in Fig. 8 for engagement with one-half of the sheets shown in Fig. 8 and the additional stack of sheets. By this arrangement a series of bonding devices could be used to bind any thickness of sheets into one volume, some stacks of sheets being bound to the adjacent sheets on either side by two sets of bonding devices arranged in staggered relation.

Thus far only round holes have been disclosed. For some types of work oblong holes 58 have been used, as shown in Figs. 17 and 18. This is a matter of choice, the oblong holes being desirable for some types of work especially where it is desirable to hold the sheets in accurate relation to each other. The round holes are advantageous in that these are more easily made and more easily brought into registry, as the clearances are greater.

In the modification disclosed in Fig. 18, the loops 36 and 40 have not been placed in equally spaced relation from each other. In this modification two loops are found adjacent each end and one or more loops, as the case may be, near the center. This proves very satisfactory for some types of bindings where it is not necessary to firmly bind the sheets of material. In this modification the bonding portions 38 are located on the inside of the cover, so that the loops 36 and 40 span a small strip of material located between adjacent rows of holes in the back of the cover. This results in a very neat appearing structure that is efficient, dependable, easily constructed and cheap. Furthermore, this structure permits of the easy disassembly of the sheets if it is found necessary to make changes therein. When the book or volume is open, the sheets lie flat. It is not necessary to use individual sheets, as in notebooks. The sheets may be folded along the center, permitting the printing of a picture, diagram or other material over two sheets, resulting in a printed page that is uninterrupted along the center when the book is open, as best seen by referring to Fig. 22.

In the modification disclosed in Figs. 21 and 22, separate bonding devices have been shown for each end portion and for the center portion. The bonding device 70 has been used at the top of the binding. It consists of two loops, one directed in one direction and the other in the opposite direction. The bonding device 72 has been used at the bottom. It also includes a pair of loops, one directed in one direction and the other in the opposite direction. In the center, one or two loops 74 may be used. For some types of work, especially if the volume is small, one loop may be used. If the volume is large, two loops are preferably used, so as to have one project into the holes from one side and the other from the opposite side.

In Fig. 23 the bonding portions have been slightly offset from each other, that is, the bonding portion 76 has been offset from the bonding portion 78. This insures greater rigidity and more stability. Some of the loops extend in one direction and others in the opposite direction, as described in connection with the previous embodiments.

Although alternate loops have been shown directed in opposite directions, it is not essential that alternate loops be directed in opposite directions providing a group of loops is directed in one direction and one or more loops directed in the opposite direction. In other words, within the purview of this invention at least two series of loops are required, one series being directed in one direction and the other series directed in the opposite direction from the bonding portions.

When this type of binding device is used for magazines, pamphlets, booklets, notebooks and the like, the bonding device of some of the magazines, as for example every alternate magazine, may register between the holes and wires of the remaining magazines, so as to facilitate the handling of the magazines to conserve upon space in stacking and shipping the magazines. The bonding assembly shown herein lends itself to this type of production, as it is merely necessary to offset the holes in half of the magazines with respect to the holes in the other half.

Another very desirable feature of this binding assembly is the ease with which the sheets or pages may be read. Whenever the book, magazine or the like is opened and bent back upon itself, the sheets or pages lie perfectly flat, so that the reading matter is easily read, even though the printing extends near the margin where the sheets are bound together.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claims.

Having thus described my invention, I claim:

1. A bonding device formed from a continuous wire for fastening together sheets of material having marginal apertures, said bonding device including a plurality of series of loops held in spaced relation by longitudinally extending bonding portions, the longitudinal axis of one series of loops being offset with respect to the longitudinal axis of another series of loops, the loops of one series extending into the marginal apertures of some of the sheets of material, the loops of another series extending into the marginal apertures of the remaining sheets of material so as to hold the sheets together, some of the sheets of material being held by one series, other sheets of material by another series of loops.

2. In a book assembly including a plurality of superimposed sheets having registering marginal apertures and a continuous wire binding device, said binding device being characterized by a plurality of aligned link portions extending in a general direction parallel to the sheet edges adjacent the marginal apertures, the link portions being interconnected by reversely bifurcated projections, the bifurcated ends of which are connected to the link portions, alternate projections extending in opposite directions from the link portions and formed into loops extending into the apertures of the sheets, the projections extending in one direction from the link portions entering the apertures from one side of the sheets and the projections extending from the opposite side of the link portions entering other apertures from the opposite side of the sheets, so as to lock the sheets in position.

3. In a book assembly including a plurality of superimposed sheets having registering marginal apertures and a continuous wire binding device, said binding device being characterized by a plurality of oppositely disposed reversely bifurcated projecting portions curved into loops having the bifurcated ends merging into link portions, some of the free ends of the projections extending in one direction from the link portion so as to project into the apertures from one side of the sheets of material, the other projections extending in the opposite direction from the link portions so as to project into the apertures from the other side of some of the sheets of material, to thereby hold the sheets of material locked together.

4. In a book assembly including a plurality of superimposed sheets having registering marginal apertures and a continuous wire binding device, said binding device being characterized by two series of reversely bifurcated projections having the bifurcated ends merging into longitudinally extending link portions, the projections of one series being directed in one direction from the link portions, the projections of the other series being alternated with respect to the projections of the first series and extending in the opposite direction from the link portions, the projections being curved so that the free ends of the projections of one series project into the apertures of the sheet material from one side thereof and the projections of the other series being curved so as to project into alternate apertures from the opposite side of the sheet material to lock the sheet material together.

5. In a book assembly including a plurality of superimposed sheets having registering marginal apertures, a cover provided with a V-shaped rib portion having registering apertures and enclosing the sheets, and a continuous wire binding device, said binding device being characterized by a plurality of oppositely disposed reversely bifurcated projections formed into curved loops, the bifurcated ends of the projections connected to the link portions being lodged in the V-shaped rib portion of the cover, the projections extending in one direction from the link portions projecting through the apertures in one leg of the V-shaped rib portion, the projections extending in the opposite direction from the link portions projecting through the apertures in the opposite leg of the V-shaped portion, said projections extending into the apertures in the sheets to lock the same in the cover.

6. A bound volume comprising a plurality of superimposed sheets of material having registering marginal apertures and a flexible lock fastening device, said flexible lock fastening device including a plurality of continuous wires for securing the sheets of material together, each of said wires being formed into a plurality of reversely bifurcated projections formed into curved loops, longitudinally extending link portions connected to and extending between adjacent bifurcated ends of adjacent projections, some of the loops extending in one direction from the links and the others in the opposite direction, the loops extending in one direction projecting into apertures from one side of the sheets of material, the loops extending in the opposite direction projecting into apertures from the opposite side of the same sheets of material, the flexible lock fastening device formed from one wire being disposed adjacent one end of the edge of the sheets adjacent the marginal apertures, another wire being disposed in the opposite end of the edge, so that one wire holds the sheets together near one end thereof and another wire holds the sheets together near the opposite end thereof.

7. A bound volume including a plurality of stacks of sheets of marginally apertured material and a flexible lock binding device, said flexible lock binding device including a plurality of oppositely disposed reversely bifurcated projections having the bifurcated ends of adjacent projections interconnected by link portions, the projections being formed into curved loops, some of the loops extending in one direction from the link portions so as to have the free ends projecting into apertures from one side of a stack of sheets of material, the other loops extending in the opposite direction from the link portions so as to project into the apertures of another stack of sheets of material from the opposite side to thereby hold the stacks of sheets of material together.

8. A bound volume comprising a plurality of superimposed sheets of material having registering marginal apertures and a flexible lock binding device, said flexible lock binding device including a plurality of wires, each of said wires being formed into a plurality of reversely bifurcated projections formed into curved loops, some of which are directed in one direction and the others in the opposite direction, link portions for interconnecting the adjacent bifurcated ends of adjacent projections of each wire, at least some of the loops of one wire entering apertures in the sheets having loops of another wire entering through other apertures therein, the loops extending in one direction from each wire projecting into apertures from one side of the sheets held thereby, the loops extending in the opposite direction projecting into apertures from the opposite side of the sheets held thereby.

DAVID M. DUNWOODIE, Sr.